(12) United States Patent
Prevot

(10) Patent No.: US 11,499,656 B2
(45) Date of Patent: Nov. 15, 2022

(54) CLAMPING SYSTEM COMPRISING A COLLAR AND A PRE-MOUNTING CLIP

(71) Applicant: CAILLAU, Issy-les-Moulineaux (FR)

(72) Inventor: Fabrice Prevot, Selles-sur-Cher (FR)

(*) Notice: Subject to any disclaimer, the term of this patent is extended or adjusted under 35 U.S.C. 154(b) by 48 days.

(21) Appl. No.: 17/308,213

(22) Filed: May 5, 2021

(65) Prior Publication Data
US 2021/0356060 A1 Nov. 18, 2021

(30) Foreign Application Priority Data
May 13, 2020 (FR) ...................................... 2004716

(51) Int. Cl.
*F16L 23/08* (2006.01)
*F16L 23/00* (2006.01)

(52) U.S. Cl.
CPC ............. *F16L 23/003* (2013.01); *F16L 23/08* (2013.01)

(58) Field of Classification Search
CPC ....................................................... F16L 25/06
USPC ................................................. 285/407, 367
See application file for complete search history.

(56) References Cited

U.S. PATENT DOCUMENTS

| 9,494,265 B2 | 11/2016 | Ghirardi | |
|---|---|---|---|
| 10,571,056 B2 | 2/2020 | Velecky | |
| 2014/0217728 A1* | 8/2014 | Ghirardi | F16L 23/08 285/410 |
| 2016/0069495 A1* | 3/2016 | Statler, III | F16L 23/006 285/407 |
| 2017/0276283 A1* | 9/2017 | Kerns | F16L 23/006 |
| 2017/0292643 A1* | 10/2017 | Prevot | F16L 23/08 |
| 2018/0135786 A1* | 5/2018 | Bourbon | F16L 23/06 |
| 2021/0018123 A1* | 1/2021 | Drivon | F16L 23/036 |

* cited by examiner

*Primary Examiner* — Aaron M Dunwoody
(74) *Attorney, Agent, or Firm* — Robert Facey

(57) ABSTRACT

A clamping system to connect a first and a second tube whose facing ends have protruding clamping surfaces is provided. The system comprises a collar comprising a belt able to be clamped around the clamping surfaces. The belt has a first and a second flank between which an internal recess able to receive the clamping surfaces is delimited. The collar carries an outer retaining clip comprising a retaining segment located on the side of the first flank and a first and a second link return linking respectively the retaining segment to a first and a second retaining member located on the side of the second flank. The collar is retained axially between the retaining segment and the first and second retaining members. The retaining segment is able to be elastically deformed to allow the insertion of the end of the tube and to retain it pre-mounted in the collar.

18 Claims, 6 Drawing Sheets

[Fig. 1]
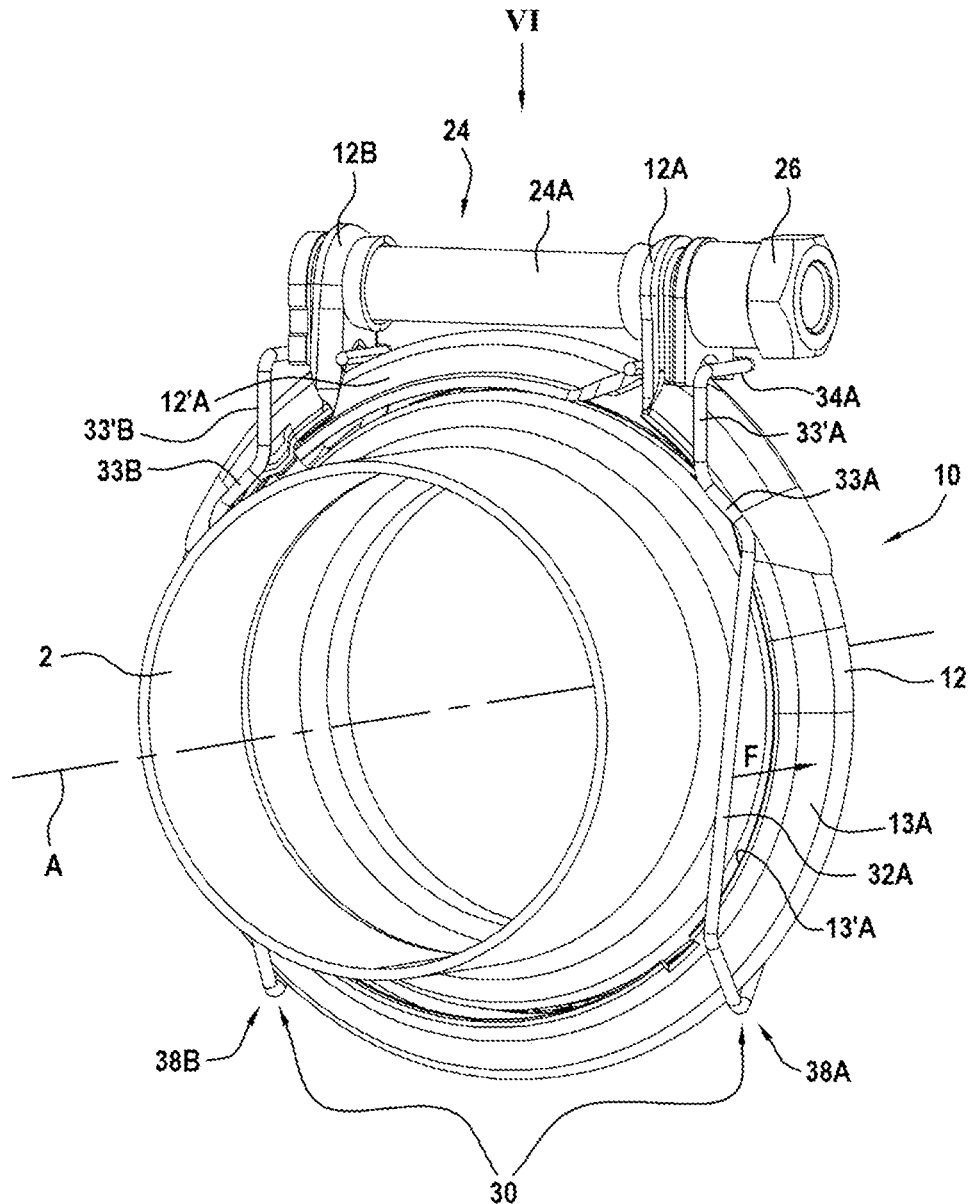

[Fig. 2]
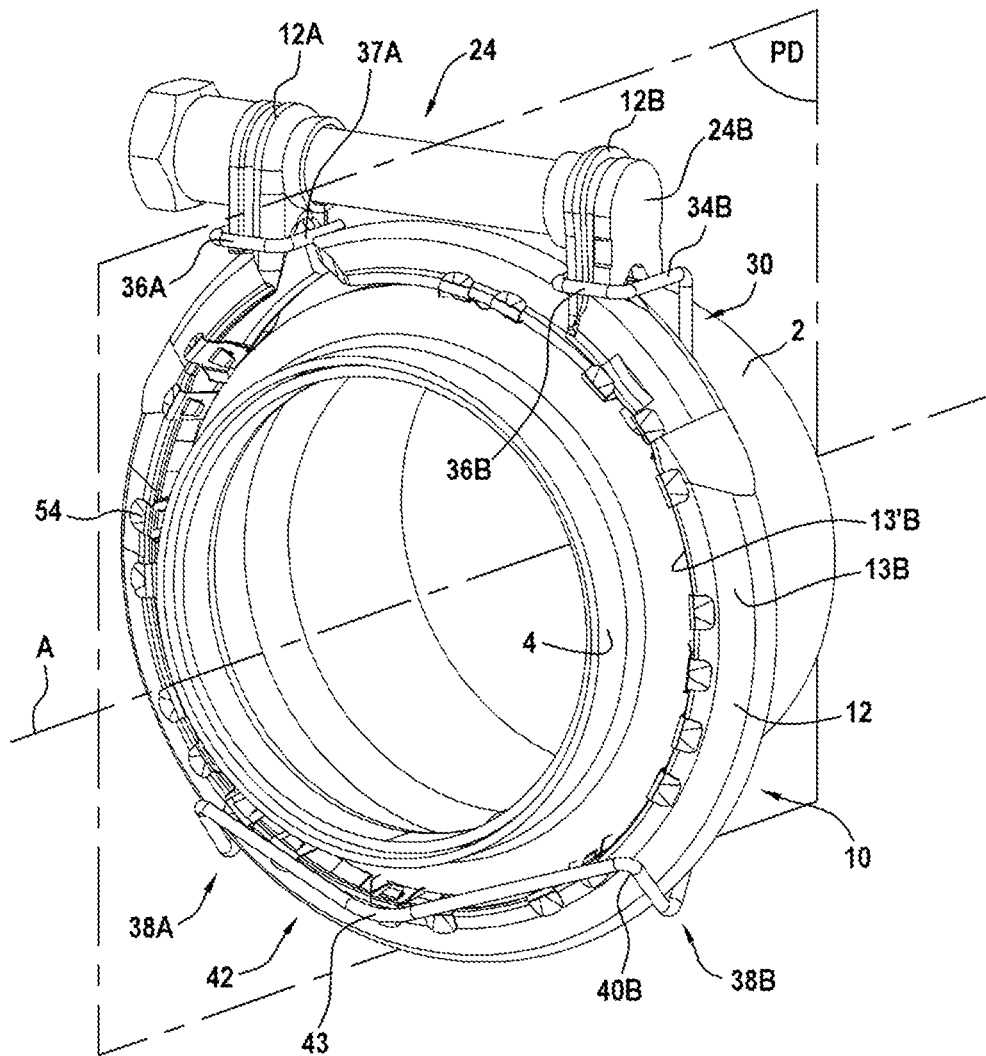

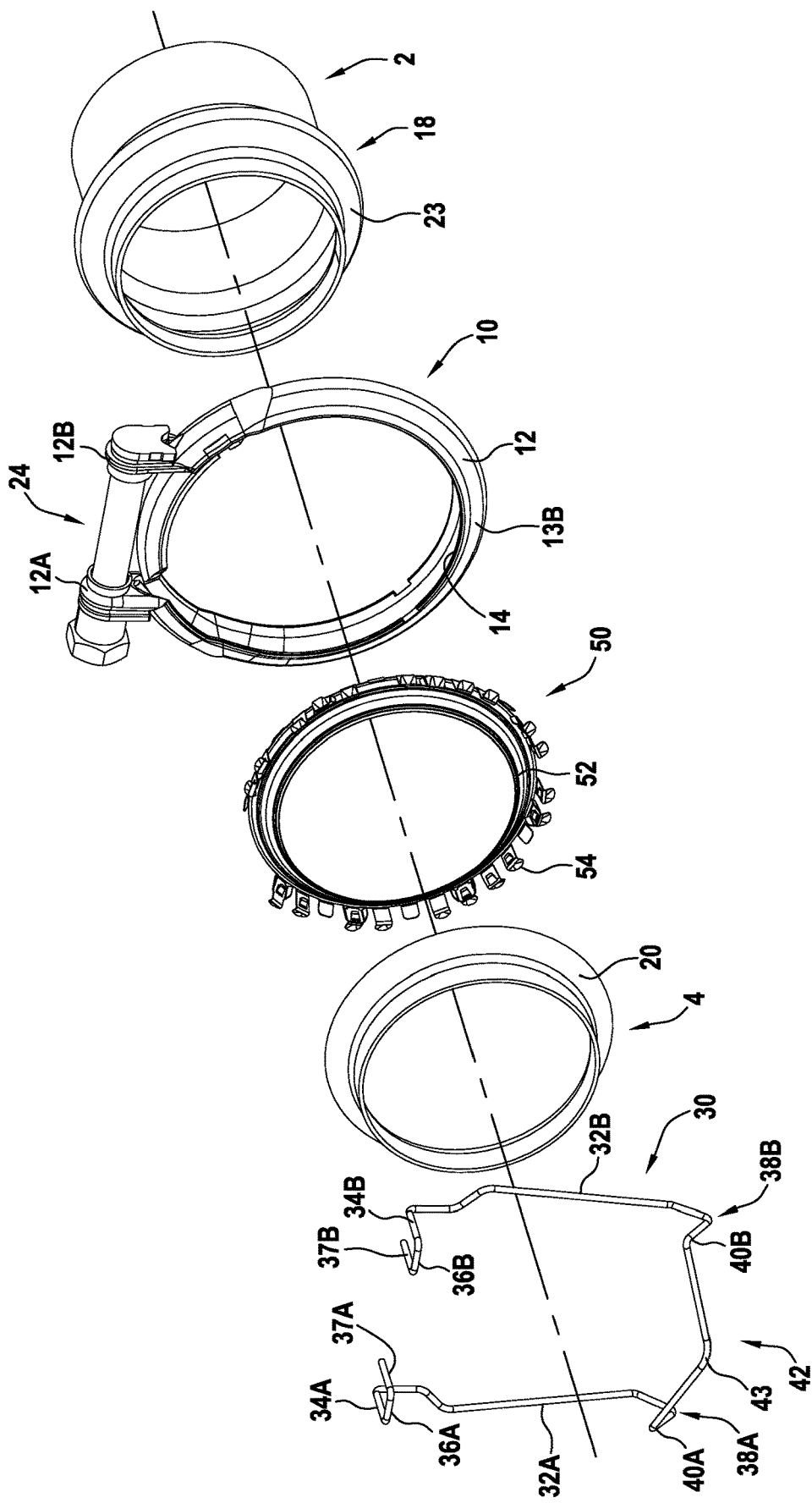

[Fig. 4]
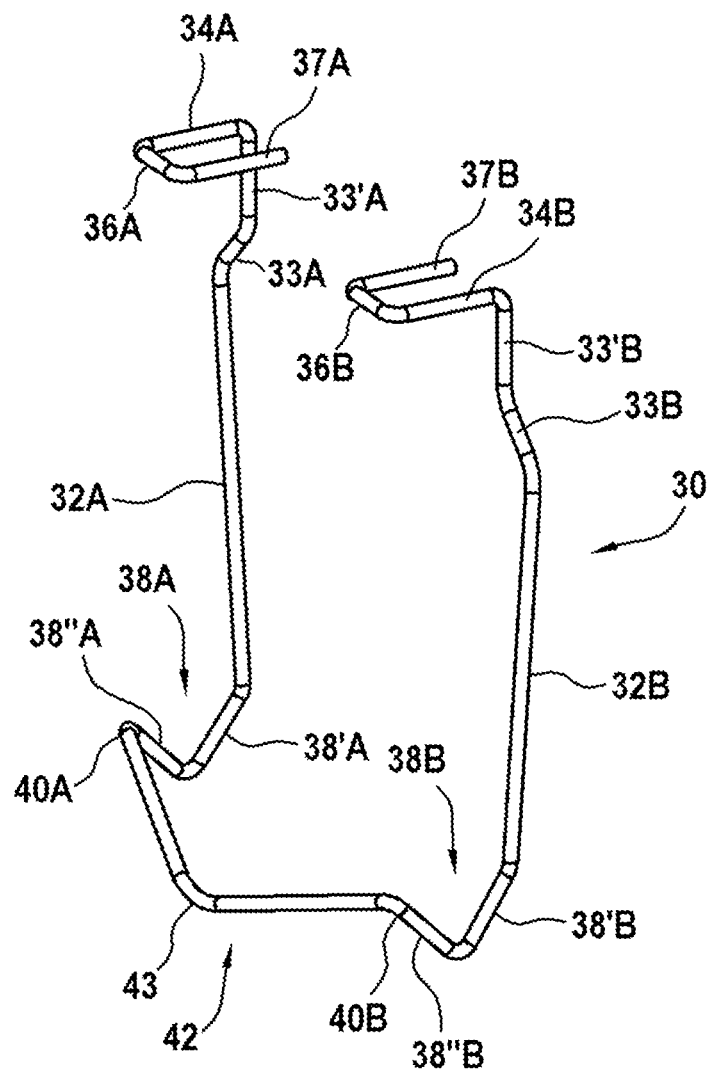

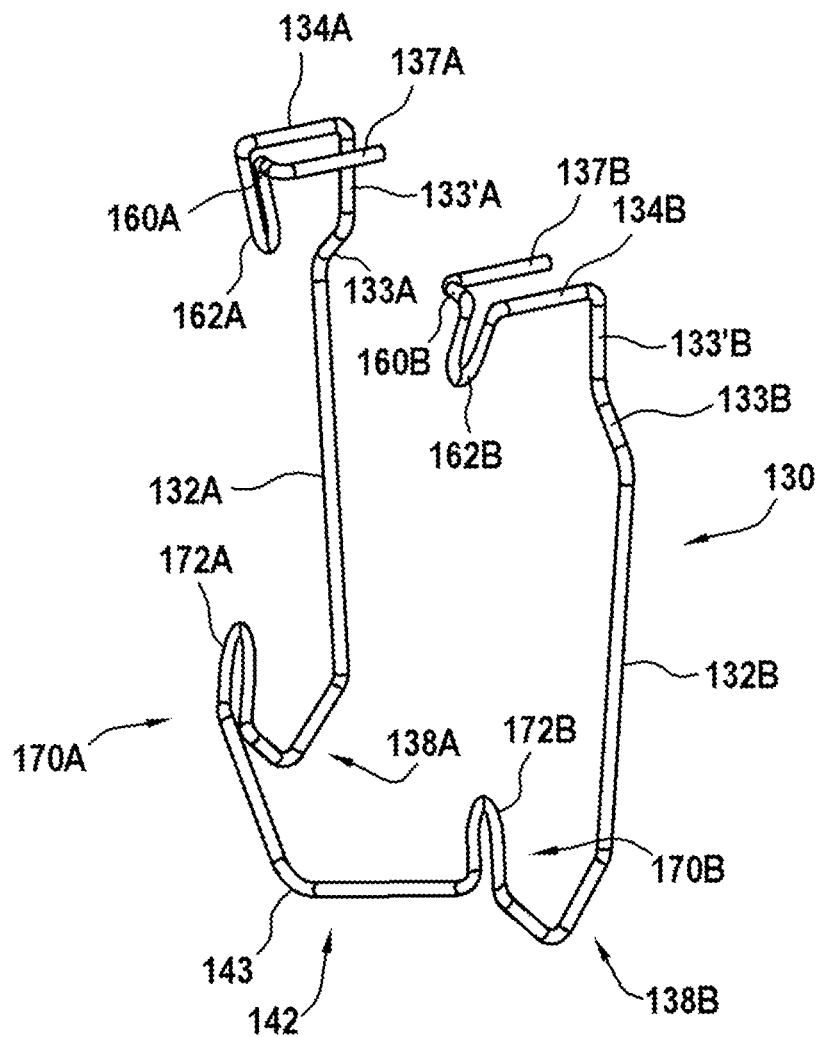
[Fig. 5]

[Fig. 6]
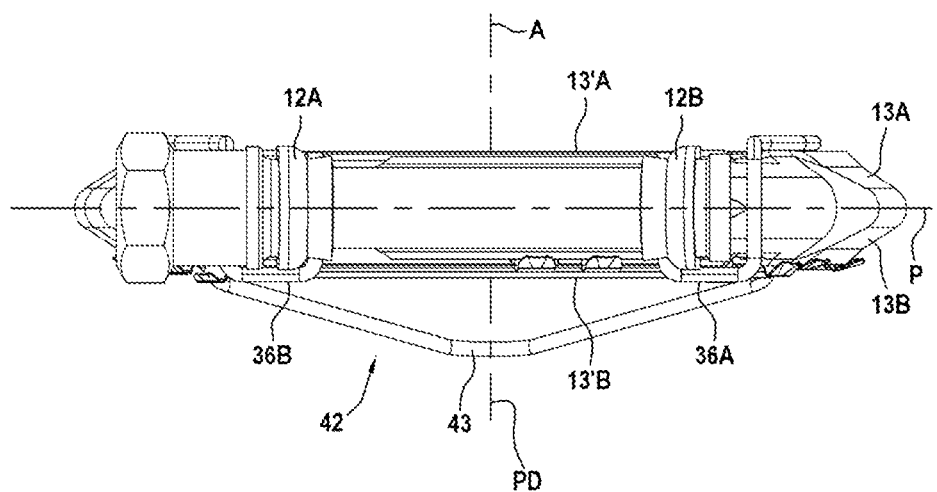

CLAMPING SYSTEM COMPRISING A COLLAR AND A PRE-MOUNTING CLIP

BACKGROUND

The present disclosure relates to a clamping system for connecting a first and a second tube whose facing ends have clamping surfaces protruding relative to the cylindrical external surface of said tubes.

A clamping system of this type is known, for example from European patents EP 1 451 498 and EP 2 598 785.

In such a system, the collar comprises a belt able to be clamped around the clamping surfaces of the tubes. The belt has flanks between which an internal recess is delimited in which the clamping surfaces of the tubes are disposed in order to achieve the clamping. The tubes are thus retained clamped relative to each other. As indicated in the aforementioned patents, it may be useful to pre-mount the clamping system on the end of at least one of the tubes before operating the clamping.

EP 1 451 498 proposes a system allowing a pre-mounting relative to a tube, using pre-mounting legs carried by the belt via a washer which is itself carried by the belt. This system is satisfactory but, by definition, it requires the presence of a washer whose shape can be relatively complex, which impacts the production and mounting costs.

In order to allow a pre-mounting on the two tubes, EP 2 598 785 also uses a washer, carried by the collar and comprising first and second pre-mounting legs able to cooperate respectively with the first and with the second tube to retain the washer, and therefore the entire clamping system, relative to the respective clamping surfaces of the tubes before the clamping. This system is also satisfactory, but it also requires the presence of a relatively complex shaped washer. This shape is made more complex by the necessity of making two types of legs, extending on either side of the washer to hook respectively on each of the two tubes. Particularly, the design and the dimensioning of the legs achieving the hooking on the furthest tube from the washer in a pre-mounted situation can be difficult for these legs to have both the mechanical resistance necessary for the good retention on this tube and the flexibility upon their elastic flexure during the insertion of this tube into the collar.

Other clamping systems comprising a collar and a washer carried by the collar are also known, the washer having inner legs, able to grip inside one of the tubes, to pre-mount the clamping system at the end of this tube. It may be useful to complete this system to also allow a pre-mounting relative to the other tube. For this, it is possible to use the long legs proposed by EP 2 598 785 but, particularly for collars of large diameters, there is a need for another solution, substantially free from the aforementioned drawbacks.

US20140217728 discloses a clamping system which comprises a collar and a pre-positioning fastener comprising a belt portion able to encircle a tube, the fastener being fixed to the collar by legs.

SUMMARY

In general, there is a need for a clamping system for connecting two tubes, comprising a collar which can be easily retained in a pre-mounted situation at the end of one of the tubes, this independently of the fact that the clamping system comprises or does not comprise a clamping washer carried in the collar.

Thus, the present disclosure relates to a clamping system for connecting a first and a second tube whose facing ends have clamping surfaces protruding relative to the cylindrical external surface of said tubes, the system comprising a collar which comprises a belt able to be clamped around said clamping surfaces, the belt having a first and a second flank which extend on either side of a median radial plane perpendicular to the axis of the belt and between which an internal recess able to receive the clamping surfaces is delimited, the collar carrying an outer retaining clip which comprises:

a retaining segment and an additional retaining segment angularly spaced from each other and located on the side of the first flank, a first and a second retaining member which are located on the side of the second flank and linked to the retaining segment, and a first and a second additional retaining member which are located on the side of the second flank and linked to the additional retaining segment, so that the collar is retained axially between, on the one hand, the retaining segment and the additional retaining segment and, on the other hand, the first and second retaining members and the first and second additional retaining members, the retaining segment and the additional retaining segment being able, from a rest situation in which they protrude towards the axis of the belt relative to the edge of the first flank in an unclamped situation of the belt, to be elastically deformed in order to be away from the axis of the belt.

Thus, the retention of the clamping system relative to the clamping surface of the first tube is particularly easy to implement. This retention uses a simple outer clip whose correct positioning can be easily checked.

In addition, this clip is compatible with the presence of a washer internal to the collar, so that the system may comprise such a washer or on the contrary not have one. Moreover, if the system includes a washer, it is perfectly possible to provide that the clip serves for the pre-mounting retention on one of the tubes and that the washer is configured to serve for the pre-mounting retention on the other tube, for example by being of the type of the washer of EP 1 451 498.

The clip is easy to mount on the collar thanks to the elastic deformation of the retaining segment and of the additional retaining segment. When the first tube is fitted inside the clamping system, the retaining segment and the additional retaining segment deflect outwardly to allow the insertion of the clamping surface of the first tube into the collar, before naturally returning to their rest positions, in which they interfere with the edge of the first flank while cooperating with the clamping surface of the first tube to prevent the clamping surface of the first tube from coming out of the collar untimely.

Optionally, the first and second retaining members are linked to the retaining segment by, respectively, a first and a second link return.

Optionally, the first and second additional retaining members are linked to the additional retaining segment by, respectively, a first and a second additional link return.

Optionally, viewed from the side of the first flank, the first and second retaining members are hooked on one area of the collar which is located on the other side of the median radial plane relative to the first flank.

Optionally, viewed from the side of the first flank, at least one of the first and second retaining members is hooked on the second flank.

Optionally, the collar has at least one lug protruding radially relative to the circumference of the belt, particularly a lug serving for the clamping of the belt and, viewed from the side of the first flank, at least one of the first and second retaining member is hooked on said lug.

Optionally, at least one of the first and second retaining members forms part of a loop.

Optionally, at least one of the first and second link returns follows the external shape of the flanks.

Optionally, the retaining segment and the additional retaining segment are diametrically opposite.

Optionally, the second retaining member and the second additional retaining member are linked by a link segment located on the side of the second flank.

Optionally, the link segment comprises a portion forming a handling lever, axially spaced apart from the second flank.

Optionally, the outer retaining clip is symmetrical relative to a diametral plane of the belt.

Optionally, the outer retaining clip is formed of wire material, particularly of metal wire.

Optionally, the retaining segment has in the free state a rectilinear shape, parallel to a diameter of the belt and, optionally, the additional retaining segment has in the free state a rectilinear shape, parallel to a diameter of the belt.

Optionally, the outer retaining clip comprises an opposite retaining segment, located on the side of the second flank and able, from a rest situation in which it protrudes towards the axis of the belt relative to the edge of the second flank in an unclamped situation of the belt, to be elastically deformed in order to move the opposite retaining segment away from the axis of the belt.

Optionally, at least one of the first and second retaining members has an extension in which the opposite retaining segment is formed.

The present disclosure will be well understood and its advantages will be better apparent upon reading the following detailed description of one embodiment represented by way of non-limiting example.

BRIEF DESCRIPTION OF THE DRAWINGS

FIG. 1 represents in perspective a clamping system, in accordance with the invention, in a pre-mounted situation on the ends of the tubes that said clamping system serves to connect together, viewed from the side of one of the tubes.

FIG. 2 is a view similar to that of FIG. 1, viewed from the side of the other tube.

FIG. 3 is an exploded perspective view showing the different elements constituting the clamping system as well as the ends of the tubes that said clamping system serves to connect together.

FIG. 4 shows the clip of the clamping system viewed in perspective.

FIG. 5 shows the clip of the clamping system according to one variant.

FIG. 6 shows the clamping system in top view, according to the arrow VI of FIG. 1.

DETAILED DESCRIPTION

FIGS. 1 to 3 are described first. It can be seen that the clamping system according to the present disclosure comprises a collar 10 of the same type as the one described in EP 1 451 498, which serves to connect together a first and a second tube 2, 4.

In what follows, the elements directed towards the axis A of the belt 12 of the collar will be referred to as "radially inner" elements, as opposed to other elements referred to as "radially outer" elements, the "radially outer" elements being those that are directed away from the axis A. It is also considered that the axis A of the belt is also the axis of the tubes 2, 4 when they are assembled.

Furthermore, it will be considered that a second element is "external" or "axially external" to a first element, if the second element is located next to the first one, outside the axial section occupied by the first element.

As can be seen better in FIG. 3, the belt 12 of the collar, that is to say the portion of this collar that is wound about the axis A, delimits a recess 14 in which the clamping surfaces, respectively the clamping surface 18 belonging to the first tube 2 and the clamping surface 20 belonging to the second tube 4, can be inserted. This recess and these clamping surfaces have shapes such that the clamping of the belt of the collar forces the ends of the tubes 2 and 4 to come closer to each other. The recess 14 is delimited between a first and a second flank 13A and 13B of the belt 12, these flanks in this instance defining branches of a V viewed in axial section. Thus, the belt 12 has an advantageously V-shaped axial section whose tip is directed outwardly, while the clamping surfaces 18 and 20 have a diameter which gradually increases towards the free ends facing the tubes and are for example of frustoconical shape. However, the belt could have a section that would be closer to a U, for example.

The belt 12 has ends, respectively 12A and 12B, which are straightened substantially radially so as to form bearing legs. These legs present holes so as to allow the passage of the rod 24A of a clamping screw 24 through these legs. The head 24B of the screw is wedged relative to one of the bearing legs, in this instance the leg 12B, while a nut 26 is retained relative to the other bearing leg 12A. It will be understood that the rotation of the nut in the screwing direction brings the bearing legs closer to each other and therefore reduces the internal diameter of the collar, that is to say it allows clamping the belt of the collar. Of course, other ways of clamping the belt can be envisaged, for example a hooking system, as described in particular in patent application FR 3 008 160. In this instance, the belt 12 has an extension forming a flap 12'A which extends between the bearing legs 12A and 12B. It is understood that, in the clamped situation of the belt, this flap prevents a discontinuity in the bearing of the belt on the clamping surfaces of the tubes.

In this instance, the end of the tube 4 is a female flare shape, the inner periphery of its clamping surface 20 forming a flare shape. On the other hand, the free end of the first tube 2 is a male end which, beyond the clamping surface 18, has an external periphery 23 whose diameter gradually decreases towards the termination of the free end. The thus formed end portion 23 can therefore be inserted, substantially in a form-fitting manner, inside the flare shape formed at the end of the tube 4.

The clamping system comprises an outer retaining clip 30 which, as can be seen particularly in FIGS. 1 and 2, is disposed outside the collar and serves for the retention of the tube 2 in a pre-mounted situation relative to the clamping system. As can be seen particularly in FIG. 1, this outer retaining clip 30 comprises a retaining segment 32A which is located on the side of the first flank 13A of the belt. It also comprises a first link return 34 which links the retaining segment 32A to a first retaining member 36A located on the side of the second flank 13B, and a second link return 38A which links the retaining segment 32A to a second retaining member 40A, also located on the side of the second flank 13B. It is understood, in particular by comparing FIGS. 1 and 2, that the collar 10 is retained axially between, on the one hand, the retaining segment 32A and, on the other hand, the first and second retaining members 36A and 40A. These first and second retaining members are spaced from each other along the periphery of the belt, so that they retain the belt, on the side of the second flank 13B, in two angularly spaced areas.

Furthermore, it can be seen in FIG. 1 that the retaining segment 32A protrudes inwardly relative to the edge 13'A of the first flank 13A. Indeed, it is located further towards the axis A of the belt than this edge, which allows it to be retained behind the clamping surface 18 of the first tube 2 when this clamping surface is inserted inside the collar. Here, the term "behind" is understood as opposed to the direction of engagement of the clamping surface in the collar, which is then the forward direction. Indeed, to allow this insertion, the retaining segment 32A can be elastically flexed outwardly, as indicated by the arrow F. It is understood that in its natural rest position, the retaining segment is actually located further towards the axis A than the edge 13'A of the flank 13A of the belt.

In this instance, the retaining clip 30 also has an additional retaining segment 32B angularly spaced from the retaining segment 32A and also located on the side of the first flank 13A of the belt. The retaining clip 30 also comprises a first additional retaining member 36B located on the side of the second flank 13B and linked to the additional retaining segment 32B by a first additional link return 34B, as well as a second additional retaining member 40B, also located on the side of the second flank 13B, and linked to the additional retaining segment 32B by a second additional link return 38B. These first and second additional retaining members are spaced from each other along the periphery of the belt.

The additional retaining segment 32B is angularly spaced from the retaining segment 32A. Like the retaining segment 32A, the additional retaining segment 32B protrudes towards the axis of the collar relative to the edge 13'A of the first flank 13A in an unclamped situation of the belt and can be elastically deformed to move away from the axis of the collar and allow the insertion of the clamping surface of the first tube. Thus, the retaining segment 32A and the additional retaining segment 32B retain the clamping surface of the first tube 2 in two areas angularly spaced from this clamping surface, and therefore promote the alignment of the axis of the tube with that of the belt and avoid respective angular clearances of the first tube and of the collar in the pre-mounted situation.

Indeed, in the example shown, the retaining segment 32A and the additional retaining segment 32B are diametrically opposite, that is to say, when the clip is mounted on the collar, they are located on either side of a diametral plane PD (see FIGS. 2 and 6: plane passing through the axis A and perpendicular to the plane of FIG. 6) by being at an equal distance from this plane PD. In this instance, the retaining clip 30 is symmetrical relative to such a diametral plane. It is particularly a diametral plane defined by the axis A and located at equal distance from the bearing legs 12A and 12B of the collar.

The two retaining segments being similar in this instance, there will now be a focus more specifically on one of them, for example the retaining segment 32A. It can be seen that this retaining segment is in this instance rectilinear, and forms a retaining bar which is oriented transversely to the axis A. However, the retaining segment could have a different shape, particularly be naturally curved in the direction tending to bring it closer to the axis A. When the outer retaining clip 30 is mounted on the collar, the retaining segment 32A is therefore located outside the belt, against the edge 13'A of the first flank 13A of the belt. The link returns 34A and 38A link the retaining segment to the first and second retaining members 36A, 40A. Indeed, these first and second retaining members are conversely located on the side of the second flank 13B of the belt. Thus, the first and second retaining members extend on the other side of the median radial plane P (see FIG. 6) of the belt relative to the retaining segment.

It could be provided that the first and second retaining members are hooked against the edge 13'B of the second flank 13B. In the example represented, this is the case for the second retaining member 40A that FIG. 2 shows extending radially inwardly beyond the edge 13'B of the second flank 13B.

However, with regard to the first retaining member 36A, advantage in this instance is taken of the presence of the bearing legs 12A and 12B of the collar. Thus, as can be seen in FIG. 2, the first retaining member 36A is hooked on the bearing leg 12A. In general, the bearing leg 12A forms a lug protruding radially relative to the circumference of the belt. In this case, it is a bearing leg in the sense that it cooperates with the clamping screw to clamp the collar. It could be a radially protruding lug serving for the clamping, for example by hooking with a hook, as described in one of the embodiments of the application FR 3 008 160.

In this case, the retaining member 36A forms part of a loop of the clip, through which the base of the bearing leg 12A has passed. In this instance, this loop is formed in an end area of the clip, the retaining member 36A being extended by a terminal portion 37A which forms a free end of the clip (see FIGS. 3 and 4). The link return 34A, the first retaining member 36A and the terminal portion 37A together form the loop which is passed around the base of the bearing leg 12A. In this instance, this loop has a U shape.

The conformation is similar with regard to the additional retaining segment 32B, and it is seen that the additional link return 34B, the first additional retaining member 36B and the terminal portion 37B together form a loop which is passed around the base of the bearing leg 12B of the belt. In this instance, the clip is of the open type between the first retaining member 36A and the first additional retaining member 36B.

Indeed, as indicated, the terminal portions 37A and 37B end with dissociated free ends. Insofar as the loops are passed around the bearing legs 12A and 12B, it is understood that the fact that the clip is devoid of a link segment between these two loops promotes its ability to accompany the approximation of the bearing legs during the clamping of the collar.

However, it could be perfectly conceivable that the clip is of the closed type, for example with a link section between the terminal portions 37A and 37B, this section being able to deform or break during the clamping of the collar.

In this instance, the connection of the retaining segment 32A to the link return 34A is made by an intermediate portion 33A which is oriented along the circumference of the edge 13'A of the belt, this intermediate section being itself linked to a straightened portion 33'A which forms a radial spacer between the intermediate section 33A and the first retaining member 34A. Likewise, the additional retaining segment 32B is linked to the first additional retaining member 34B by an intermediate portion 33B and a straightened portion 33'B (see FIG. 4).

In this instance, the straightened portions 33'A and 33'B extend substantially in a plane perpendicular to the axis A and therefore gradually move apart from the flank 13A of the belt as it moves away from the axis A.

However, it can be perfectly envisaged that at least one of the first and second link returns on the contrary follows the external shape of the flanks. It is in this instance the case with the second link return 38A. It can indeed be seen that the latter includes two branches, respectively 38'A and 38"A which form two branches of a V generally matching the external shape of the belt. The same applies to the second additional retaining member, with two branches 38'B, 38"B.

The clip 30 is in this instance formed in a wire material, particularly metal wire, which is folded so that the clip has different areas which have just been mentioned.

As indicated, the clip 30 is in this instance an open-type clip, the terminal segments 37A and 37B each comprising a free end. On the other hand, in this instance, on the side of the second retaining member 40A and of the second additional retaining member 40B, the clip 30 has a link segment 42. This link segment therefore extends from one to the other of the second retaining member 40A and of the second additional retaining member 40B. In this instance, this link segment has a central portion 43 which is away from the edge 13'B of the second flank 13B on the axially external side of this second flank. Generally, the link segment has two sections which extend respectively between the second retaining member 40A and the portion 43, and between the second additional retaining member 40B and the portion 43 by gradually moving away from the second flank 13B as they move closer to the portion 43. This portion 43 of the link segment 42 forms a handling lever, which is axially spaced apart from this second flank and which thus facilitates the mounting of the clip on the collar and the dismounting of the clip from the collar.

The retaining clip 30 allows pre-mounting the clamping collar at the end of the first tube 2. In this instance, the clamping system can also be kept pre-mounted at the end of the other tube 4. In the embodiment represented in FIGS. 1 to 3, 6 and 7, this is achieved by means of a washer 50 that the clamping system includes. This washer can for example be generally of the same type as described in EP 1 451 498, in that it has an annular portion and legs by which it is retained relative to the collar. Thus, the washer 50 has a frustoconical annular portion 52 which can be inserted between the ends facing the tubes 2 and 4 when they are engaged in the clamping system. Indeed, the washer 50 is retained relative to the belt, in this instance relative to its second flank 13B, by fixing legs such that an annular space is formed between the second flank and the washer. The free end of the second tube 4 carrying its clamping surface 20 is inserted into this annular space inside the recess 14, while the free end of the first tube 2 carrying its clamping surface 18 is inserted on the opposite side of the annular space relative to the washer, that is to say against the inner face of the frustoconical portion 52 of the washer 50. In this instance, as indicated, the end of the tube 4 is a female flare shape, the inner periphery at its clamping surface 20 forming a flare shape. On the other hand, the free end of the first tube 2 is a male end which, beyond its clamping surface 18, has an external periphery 23 whose diameter gradually decreases towards the termination of the free end. The portion of the thus formed end 23 can therefore be inserted, substantially in a form-fitting manner, inside the flare shape formed at the end of the tube 4. The frustoconical portion 52 of the washer 50 can have annular deformations forming a seal between the inner surface of the flare shape of the end of the first tube and the outer periphery of the end portion 23.

The fixing of the washer 50 to the collar and/or the pre-mounting of the clamping system comprising the collar and the washer on the tube 4 can be ensured in the same way as in EP 1 451 498, by fixing legs or by pre-mounting legs 54 with which the washer is fitted. As seen in particular in FIG. 3, these legs can be of several types, some can be shaped as hooks to hook on the edge 13'B of the flank 13B, others can be formed by the bracing tabs intended to cooperate with the inner periphery of the flank 13B. Some of these legs also have gripping surfaces, for example formed by tabs bent inwardly to grip on the clamping surface 20A of the tube 4 when they are engaged in the collar.

However, other modes of fixing the washer to the collar can be used. For example, the washer may have a retaining loop in which the shank of the screw 24 can be engaged, as well as one or several retaining legs which can be retained on the edge of the belt, for example by hooking or by pinching. Likewise, other modes of pre-mounting the clamping system can be used relative to the tube 4, for example by equipping the washer with inner legs or clamps which engage in the tube 4 to cling to the inner surface of the tube 4.

FIG. 5 shows one variant 130 for the outer retaining clip, which allows this clip to ensure the pre-mounting relative to each of the two tubes. This clip 130 has strong similarities with the clip 30 which has just been described. The elements of the clip 130 which are common to the clip 3 are designated in FIG. 5 by the same references increased by 100. The difference between the clip 30 and the clip 130 is that the latter has, in addition, an opposite retaining segment located on the side of the second flank 13B of the belt to cooperate with the clamping surface of the second tube 4. In this instance, this opposite retaining segment is formed in an extension of one of the first and second retaining members.

In this instance, the clip 130 has such an opposite retaining segment formed in an extension of each of the retaining members. Thus, the first retaining member 160A has an extension forming a deformation 162A which extends radially inwardly and forms an opposite retaining segment.

In this instance, this extension is formed by a U-shaped loop whose base is located radially inwardly. Likewise, the second retaining member 170A also has an extension 172A which extends radially inwardly and also forms an opposite retaining segment, by having in this instance the shape of a loop. In this case, the clip 130 also comprises first and second additional retaining members respectively 160B and 170B, which also have similar extensions respectively 162B and 172B. The loops in which the opposite retaining segments 162A and 172A and the additional opposite segments 162B, 172B are formed, are shaped such that they can be flexed during the insertion of the end of the tube 4 into the collar to move apart in order to allow this insertion and elastically return in position to retain the end of the tube 4 inside the collar in a pre-mounting situation.

The outer retaining clip is stably retained relative to the collar, by the two axially opposite sides of the collar. It can be mounted on the collar and be dismounted, and the system may not include additional fixing means, particularly a permanent fixing such as a weld or the like. Indeed, once mounted on the collar, the retaining clip remains attached thereto in a reliable manner. It is an easy part to manufacture at low cost, which may or may not be associated with the collar, thereby allowing a wide range of offers.

The invention claimed is:

1. A clamping system for connecting a first and a second tube whose facing ends have clamping surfaces protruding relative to a cylindrical external surface of said tubes, the system comprising a collar which comprises a belt able to be clamped around said clamping surfaces, the belt having a first and a second flank which extend on either side of a median radial plane perpendicular to an axis of the belt and between which an internal recess able to receive the clamping surfaces is delimited, the collar carrying an outer retaining clip which comprises:

- a retaining segment and an additional retaining angularly spaced from each other and located on the side of the first flank,
- a first and a second retaining member which are located on the side of the second flank and linked to the retaining segment, and
- a first and a second additional retaining member which are located on the side of the second flank and linked to the additional retaining segment, so that the collar is retained axially between, on the one hand, the retaining segment and the additional retaining segment and, on the other hand, the first and second retaining members and the first and second additional retaining members, the retaining segment and the additional retaining segment being able, from a rest situation in which said retaining segment and said additional retaining segment protrude towards the axis of the belt relative to an edge of the first flank in an unclamped situation of the belt, to be elastically deformed in order to move the retaining segment and the additional retaining segment away from the axis of the belt.

2. The clamping system according to claim 1, wherein, viewed from a side of the first flank, the first and second retaining members are hooked on one area of the collar which is located on an other side of the median radial plane relative to the first flank.

3. The clamping system according to claim 2, wherein, viewed from the side of the first flank, at least one of the first and second retaining members is hooked on the second flank.

4. The clamping system according to claim 2, wherein the collar has at least one lug protruding radially relative to a circumference of the belt, said at least one lug serving for the clamping of the belt and wherein, viewed from the side of the first flank, at least one of the first and second retaining member is hooked on said at least one lug.

5. The clamping system according to claim 1, wherein at least one of the first and second retaining members forms part of a loop.

6. The clamping system according to claim 1, wherein the retaining segment and the additional retaining segment are diametrically opposite.

7. The clamping system according to claim 1, wherein the second retaining member and the second additional retaining member are linked by a link segment located on a side of the second flank.

8. The clamping system according to claim 7, wherein the link segment comprises a portion forming a handling lever, axially spaced apart from the second flank.

9. The clamping system according to claim 1, wherein the outer retaining clip is symmetrical relative to a diametral plane of the belt.

10. The clamping system according to claim 1, wherein the outer retaining clip is formed of a wire material.

11. The clamping system according to claim 1, wherein the retaining segment has in the free state a rectilinear shape, parallel to a diameter of the belt.

12. The clamping system according to claim 1, wherein the additional retaining segment has in the free state a rectilinear shape, parallel to a diameter of the belt.

13. The clamping system according to claim 1, wherein the outer retaining clip comprises an opposite retaining segment, located on the side of the second flank and able, from a rest situation in which said opposite retaining segment protrudes towards the axis of the belt relative to an edge of the second flank in an unclamped situation of the belt, to be elastically deformed in order to move the opposite retaining segment away from the axis of the collar.

14. The clamping system according to claim 1, wherein at least one of the first and second retaining members has an extension in which the opposite retaining segment is formed.

15. The clamping system according to claim 1, wherein the first and second retaining members are linked to the retaining segment by, respectively, a first and a second link return.

16. The clamping system according to claim 15, wherein at least one of the first and second link returns follows an external shape of the flanks.

17. The clamping system according to claim 1, wherein the first and second additional retaining members are linked to the additional retaining segment by, respectively, a first and a second additional link return.

18. The clamping system according to claim 17, wherein at least one of the first and second additional link returns follows an external shape of the flanks.

* * * * *